Patented Aug. 18, 1936

2,051,122

UNITED STATES PATENT OFFICE 2,051,122

VIOLANTHRONES AND PROCESS OF PREPARING THEM

Alexander John Wuertz, South Milwaukee, Wis., assignor to E. I. du Pont de Nemours & Company, Wilmington, Del., a corporation of Delaware No Drawing. Application June 8, 1934, Serial No. 729,636. Renewed May 6, 1936

14 Claims. (Cl. 260—61)

This invention relates to derivatives of violanthrones and their preparation. It especially appertains to the substances produced by the treatment of violanthrones with carboxylic acid anhydrides.

It is well known by those skilled in the art that compounds known as benzanthrones are produced when compounds of the anthraquinone series are condensed with glycerine (see United States of America Patents 818,992 of April 24, 1906 and 809,892 of January 9, 1906 to Bally and Isler and 786,085 of March 28, 1905 to Bally.) When benzanthrones are fused with caustic alkali under appropriate conditions there are produced compounds known as violanthrones (see for example "Colour Index" 1099.)

Compounds having the violanthrone structure are powerful vat dyes. Since their discovery a tremendous amount of research work has been expended upon them. This work has developed the fact that two positions of such a nucleus are more reactive than the others. It is the general belief that the Bz-2, Bz-2' positions are the ones showing this particular chemical reactivity.

It has now been found that new organic chemical compounds, new vat dyes, new vat colors, new colored carbon compounds, new intermediates, new vattable compositions of matter, new violanthrone derivatives, and new mono-substituted violanthrones may be produced by reacting (or condensing) carboxylic acid anhydrides with violanthrones having the aforementioned reactive positions free (or unoccupied).

This invention had for an object the preparation of new chemical compounds and new processes for the production of substituted violanthrones. Other objects were the preparation of a new series of carbon compounds in a very desirable physical form and in a high state of purity. Still further objects were to produce new vat dyes, new derivatives of violanthrones (particularly without resorting to special atmospheric conditions) and to devise new chemical processes. A general advance in the art and other objects which will appear hereinafter are also contemplated.

The foregoing objects and related ends are accomplished in the manner set out in the following description in which details of what is believed to be the best mode for carrying out the invention are disclosed.

Specifically one method for accomplishing the aforementioned objects and obtaining the newly discovered products is by treating violanthrones not substituted in the Bz-2, Bz-2' positions with carboxylic acid anhydrides in the presence of aluminum chloride until one molecular proportion of the organic carboxylic acid anhydride has been condensed or reacted with one molecular proportion of the violanthrone.

The invention will be further understood by a consideration of the following detailed description and illustrative specific examples in which the quantities are given in parts by weight.

Example I

One hundred (100) parts of violanthrone were intimately mixed with 35 to 40 parts of phthalic anhydride and then introduced into 400 to 600 parts of anhydrous aluminum chloride containing about 20 to 25% of dry sodium chloride (common salt). The whole was then slowly heated to 180°–200° C., with good stirring. The mass first became fluid and finally changed to a very stiff melt. The heating was continued, however, until no further hydrogen chloride was evolved. This usually requires from two to four hours. The resultant mass was then taken up with ice water, boiled vigorously, and filtered. The residual bluish-violet cake was then boiled out with dilute ammonia solution and again filtered and washed first with hot water and then hot alcohol. From the increase of the weight thus obtained one may deduce that the resultant product is probably a phthaloyl-derivative of violanthone. The dry powder has a brownish-red sulphuric acid solution and dyes from a red alkaline hydrosulphite vat in bluish-violet to reddish-blue shades of excellent fastness to washing and soaping.

Example II

One hundred (100) parts of violanthrone were introduced into 300 to 400 parts of trichlorobenzene. To this suspension was added 35 to 40 parts of phthalic anhydride followed by an addition of 200 to 250 parts of dry aluminum chloride. The whole was then heated to 150°–200° C., for a period of 6–8 hours and then the fluid melt steam distilled in order to remove the organic solvent. The residual product was then isolated and purified in an analogous manner as is indicated in Example I. The final product was similar to the product obtained in the foregoing example.

Example III

To a melt of 400–600 parts of antimony trichloride and 200–300 parts of aluminum chloride was added 100 parts of violanthrone. This was allowed to digest completely at 100°–120° C. To the smooth melt thus obtained was added 35–40 parts of phthalic anhydride, the temperature slowly raised to 160°–180° C., and maintained at this level for a period of 2 to 4 hours or until a test sample upon vatting in an alkaline hydrosulphite vat did not show the brown-red fluorescence which is characteristic of violanthrone but not of the reaction product. The product was then isolated as previously described.

Example IV

One hundred (100) parts of dibenzanthrone (violanthrone) were suspended in 300 to 400 parts of trichlorobenzene. To this suspension were added 22–25 parts of acetic anhydride followed by an addition of 200 to 300 parts of anhydrous aluminum chloride at 40°–60° C. The temperature was then slowly raised to 140°–180° C. and maintained at this level for a period of 5 to 8 hours. The reaction became smooth and fluid when the desired end-products were formed. The melt was then transferred to a steam distillation apparatus and the trichlorobenzene blown off with steam. The residual product was then extracted with hydrochloric acid, followed by an extraction with alkali and finally with hot alcohol. The product thus obtained consisted of a dark reddish-blue powder having an intense red-violet sulphuric acid solution. It was only slightly soluble in organic solvents. From a vat it dyes cotton reddish-blue to violet-blue shades having excellent fastness properties. The compound probably has the formula:

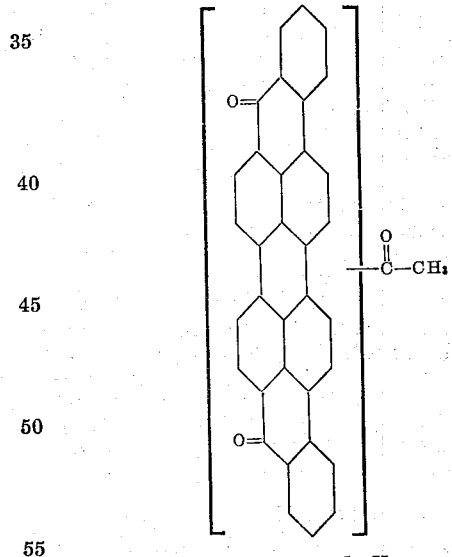

Example V

One hundred (100) parts of violanthrone were well mixed with 200 to 300 parts of anhydrous aluminum chloride. To this mixture, under good agitation, were slowly added 20–30 parts of acetic anhydride and the whole heated to 160°–190° C. When hydrogen chloride ceased to be evolved, usually 4 to 6 hours, the fusion mass was extracted with warm water and hydrochloric acid followed by an alkaline extraction. The product thus obtained was very similar to the products obtained in Example No. IV. It was found to dye cotton bluish-violet shades very readily from an alkaline hydrosulphite vat.

Example VI

To a melt of 400–600 parts of aluminum trichloride in which 100 parts of violanthrone have been dissolved or incorporated at 90–100° C., were added 40–50 parts of benzoic anhydride. The temperature was then raised to 160°–180° C. within a period of one-half to one hour and maintained at this level for approximately two to four hours. The melt was then poured into cold water which had been previously acidulated with hydrochloric acid. The suspension thus obtained was heated to 90°–100° C., and the dyestuff isolated in the same manner as set forth in the previous examples. The new dye thus obtained was found to dye cotton in redder-blue shades, from an alkaline hydrosulfite vat, than the original product. It is less sensitive to spotting with water. The new dye probably has the formula:

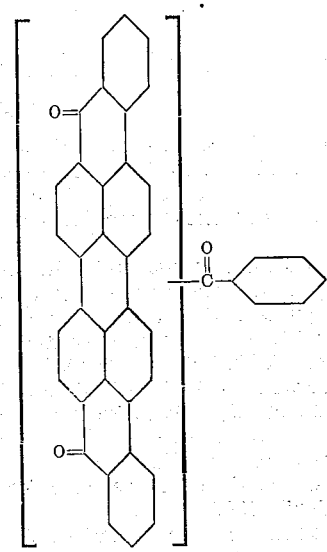

Example VII

To a fluid melt of 400–600 parts of antimony tri-chloride and 200–300 parts of aluminum chloride, in which 100 parts of violanthrone had been dissolved or incorporated at 90°–100° C., was added 40–50 parts of benzoic anhydride. The temperature was then raised to 160°–180° C., within a period of one-half to one hour and maintained at this level for approximately two to four hours. The melt was then poured into ice water which had been previously acidulated with hydrochloric acid. The suspension thus obtained was heated to 90°–100° C. and the dye isolated in the same manner as set forth in the previous examples. The new product thus obtained was found to dye from an alkaline hydrosulphite vat, in redder-blue shades than the original product (violanthrone). It proved to be less sensitive to spotting with water.

As will be obvious to those skilled in the art the invention is not limited to the utilization of the particular carboxylic acid anhydrides disclosed in the specific examples or their isomers. Special mention may be made of such other compounds as chloro-benzoic acid anhydrides, para-nitro-benzoic acid anhydride, naphthalic anhydride, para-brom-benzoic acid anhydride, alpha-naphthoic acid anhydride, naphthalene-tetracarboxylic acid anhydride, beta-naphthoic acid anhydride, anthraquinone-2-carboxylic acid anhydride, succinic anhydride, para-methyl-benzoic acid anhydride, maleic anhydride, butyric acid anhydrides, propionic acid anhydrides, fumaric acid anhydride, and their analogs and homologs.

As indicated straight or branched chain acyclic carboxylic acid anhydrides as well as cyclic compounds may be satisfactorily treated with dibenzanthrone according to the invention. In some cases the use of the acid itself particularly when this tends to form its anhydride previous to the condensation under the conditions of the process, may be found suitable.

The catholicity of the invention is apparent from the preceding description and specific examples. In addition to the carbocyclic carboxylic acid anhydrides, specific examples of which have been set out above, compounds having acyclic (as indicated above) and heterocyclic nuclei attached to the carboxyl radical are also especially suitable for the reactions utilized in this invention. The condensed ring compounds of the naphthalene and anthraquinone series merit specific mention. The aromatic carboxylic acid anhydrides such as those of the benzene and naphthalene series are quite advantageously used. Furthermore, it will be clear to those familiar with the vat dye art that other substituents than those specifically mentioned may be attached to the nuclei of the carboxylic acid anhydride compounds.

Whenever compounds are produced containing a nitro group, it will be understood that these may be reduced to the corresponding amino compounds in which state they are rendered suitable for further condensations.

The amount of antimony tri-chloride or other metal halide used as an adjuvant in the aluminum chloride melt may be varied over a wide range or omitted entirely. The addition (even in substantial proportions) of other metal salts such as sodium chloride, zinc chloride and ferric chloride (particularly those of metals exhibiting more than one valence) to the melt for the purpose of producing proper fluidity, viscosity, melting point and other physical and/or chemical conditions and reactions, may be made if found economical and expedient. From this and the specific examples, it will be clear that it is not necessary for the aluminum tri-chloride used to be of high purity.

The condensing agents disclosed in this invention may influence the orientation of the substituted groups in the resultant condensation product.

Antimony tri-chloride is a particularly desirable adjuvant. It is a solid at ordinary temperatures (temperatures up to 70°–80° C.). When in a fluid state above 70° C. this chloride is apparently capable of forming a solution or an eutectic mixture with aluminum chloride. The latter chloride is a solid body below 150°–180° C. at which temperature it tends to sublime when heated by itself. A mixture of 3 to 5 parts of antimony tri-chloride and 1 to 2 parts of aluminum chloride (based upon 1 part of violanthrone) when heated together to 80°–100° C. form a fluid melt in which violanthrone dissolves readily. When this dye is introduced into such a melt and allowed to dissolve or disperse within said melt, and when to the resultant solution or dispersion, the compounds desired to be condensed with violanthrone, are introduced a reaction ensues at a relatively low temperature (100°–160° C.). The melt during such reaction maintains a fluid appearance. In some instances the condensations are complete within a short period of time for instance a fraction of an hour. When the reactions are complete the new condensing agents of this invention permit the reaction mass to be handled with great ease.

The temperature limits set forth in the foregoing examples are capable of wide variation without harmful change in results. Ordinarily the temperature range of 40°–200° C. for the condensation is preferred. Temperatures outside this range may be used at the sacrifice of time and/or yield of product. The temperatures for producing homogeneity in the melt and for drowning the fusion are not especially significant and depend upon the convenience of the person carrying out the reaction.

Time limits are likewise elastic and no detriment to the products has been noted after prolonged heating in the reaction melt.

As shown in the above examples, the condensations in the presence of anhydrous aluminum chloride may be carried out either with or without a solvent. Suitable solvents include those mentioned in the above examples, such as, tri-chloro-benzene, and nitro-benzene as well as similar organic compounds, for example, tri-chloro-ethylenes and tetra-chloro-ethylenes.

The proportions of the reactants may be widely varied without apparently affecting the results. An excess of either reactant remains in the melt when the reaction is complete and may be removed from the final product by suitable means. The reactant present in the least molecular proportion is substantially quantitatively consumed during the reaction. Any excess of violanthrone may be separated from the condensation product by virtue of a diverse solubility in such solvents as concentrated sulphuric acid, organic solvents and alkaline hydrosulfite solutions. Any excess of the other reactants may be removed by suitable expedients for example, extraction with organic solvents or aqueous alkaline solutions.

The reactions involved in this invention may be carried out in vessels of various compositions for example, glass, enamel, cast iron and steel are suitable.

The exact change taking place in the violanthrone molecule during the treatment with the corboxylic acid anhydride is not known. It is believed that a condensation product in which the violanthrone nucleus is linked through its Bz-2 position to the carboxylic acid anhydride body with which it was reacted, is produced. The chemical analyses of the products indicate that the residual groups of the carboxylic acid anhydride remain intact and that the end products are mono derivatives of violanthrone, most likely mono-ketonic derivatives.

However, it is not desired to limit the invention to any particular theory and the above explanation is given only for the purpose of aiding in understanding the invention.

The term "dispersing" in the claims is used to cover dissolving as well as the usual process known as dispersing.

The invention or discovery has numerous advantages as will be apparent to those skilled in the art. As outstanding among these there may be mentioned the production of a new series of vat dyes and vattable products which are very stable. New and important colored compounds, coloring matters and intermediates are now made available for the art.

As many apparently widely different embodiments of this invention may be made without departing from the spirit and scope thereof, it is to be understood that I do not limit myself to the specific embodiments thereof except as defined in the appended claims.

I claim:

1. In the process of preparing new derivatives of violanthrones, the step which comprises condensing one molecular proportion of a carboxylic acid anhydride with a violanthrone whose Bz-2, Bz-2' positions are unoccupied the condensation being carried out in the pressure of aluminum chloride.

2. The process which comprises condensing a carboxylic acid anhydride with a violanthrone whose Bz-2, Bz-2' positions are unoccupied in the presence of aluminum chloride and antimony chloride.

3. The product obtainable by condensing in the presence of aluminum chloride, one molecular proportion of a carboxylic acid anhydride with a violanthrone whose Bz-2, Bz-2' positions are unoccupied.

4. The process which comprises mixing antimony trichloride and aluminum chloride, rendering the mixture liquid, dispersing therein violanthrone, thereafter adding to the resultant a carboxylic acid anhydride, maintaining the temperature of the mass at a value sufficient to allow condensation of the violanthrone and organic acid compound until the condensation has taken place and thereafter separating the condensation product.

5. In the process of condensing violanthrone with a carboxylic acid anhydride by means of aluminum chloride, the step of admixing the aluminum chloride with antimony chloride.

6. The process which comprises condensing only one molecular proportion of a carboxylic acid anhydride with violanthrone in the presence of aluminum chloride.

7. In the process of preparing new derivatives of violanthrones, the step which comprises condensing one molecular proportion of a carboxylic acid anhydride with a violanthrone whose Bz-2, Bz-2' positions are unoccupied, the condensation being carried out in the presence of aluminum chloride and a solvent.

8. The process comprising adding to about 100 parts of violanthrone suspended in about 300 to about 400 parts of trichloro-benzene about 22 to about 25 parts of acetic anhydride, then adding about 200 to about 300 parts of anhydrous aluminum chloride at about 40° to about 60° C., raising the temperature to about 140° to about 180° C., and so maintaining it for about 5 to about 8 hours, removing the trichloro-benzene and extracting the product with hydrochloric acid, then extracting with alkali and finally extracting with alcohol.

9. The process which comprises treating about 100 parts of violanthrone with about 22 to about 25 parts of acetic anhydride in the presence of about 200 to about 300 parts of aluminum chloride within the temperature range of 160–180° C.

10. The product obtainable by condensing, in the presence of aluminum chloride, one molecular proportion of acetic anhydride with violanthrone.

11. The process which comprises condensing only one molecular proportion of phthalic anhydride with violanthrone in the presence of aluminum chloride.

12. The process which comprises condensing only one molecular proportion of benzoic anhydride with violanthrone in the presence of aluminum chloride.

13. The product obtainable by condensing, in the presence of aluminum chloride, one molecular proportion of phthalic anhydride with violanthrone.

14. The product obtainable by condensing, in the presence of aluminum chloride, one molecular proportion of benzoic anhydride with violanthrone.

ALEXANDER JOHN WUERTZ.

CERTIFICATE OF CORRECTION.

Patent No. 2,051,122. August 18, 1936.

ALEXANDER JOHN WUERTZ.

It is hereby certified that error appears in the printed specification of the above numbered patent requiring correction as follows: Page 3, second column, line 43, for "corboxylic" read carboxylic; page 4, first column, line 6, claim 1, for "pressure" read presence; and that the said Letters Patent should be read with these corrections therein that the same may conform to the record of the case in the Patent Office.

Signed and sealed this 1st day of December, A. D. 1936.

(Seal)

Henry Van Arsdale
Acting Commissioner of Patents.